INVENTOR.
Hugh B. Carr
Selwyne P. Kinney
BY

ATTORNEYS

Dec. 10, 1963  H. B. CARR ETAL  3,113,589
DOUBLE DISC SHUT-OFF VALVE
Filed Nov. 15, 1960  2 Sheets-Sheet 2
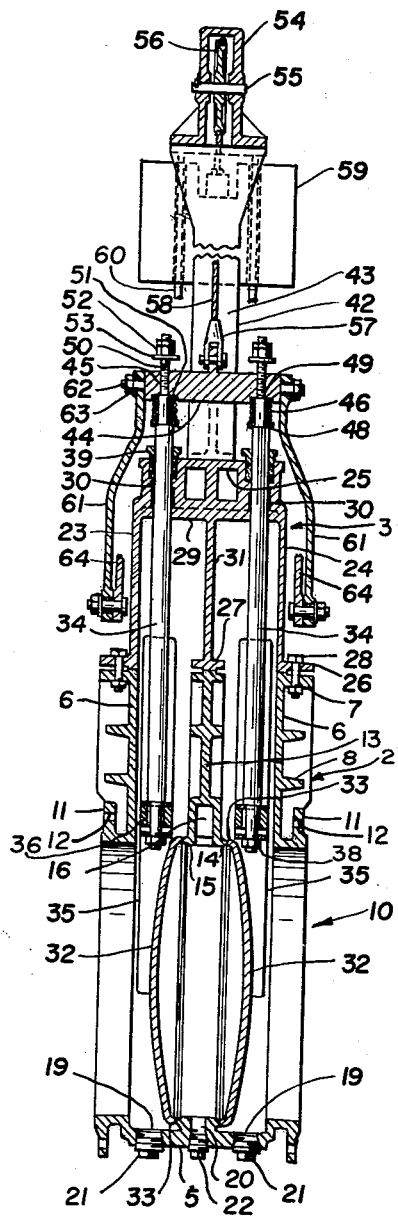
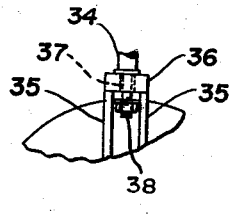
INVENTOR.
Hugh B. Carr
Selwyne P. Kinney
BY
ATTORNEYS United States Patent Office 3,113,589
Patented Dec. 10, 1963

3,113,589
DOUBLE DISC SHUT-OFF VALVE
Hugh B. Carr, Carnegie, and Selwyne P. Kinney, Pittsburgh, Pa., assignors to S. P. Kinney Engineers, Inc., Carnegie, Pa., a corporation of Pennsylvania
Filed Nov. 15, 1960, Ser. No. 69,378
5 Claims. (Cl. 137—614.11)

The present invention relates generally to the blast and combustion assembly employed with blast furnace operations. Specifically the invention relates to shut-off valves employed in admission of either air or gas to the furnace stove.

Such valves are employed in controlling flow of gases and air under pressure and must, therefore, provide both a tight seal as well as being readily moved into and out of closed or open positions. Such valves may be actuated mechanically or manually. Usually the mechanized control is also provided with an additional manual control for safety purposes.

Valves of this nature are required to function under considerable pressure and temperature. The valve of the invention must be adapted to withstand pressures up to 50 lbs. or more per square inch and working temperatures of as much as 1000° F.

An object of the present invention is to provide a valve of the character described wherein the valve discs are moved into sealing position without undue shock and are released from sealing position by an initial impact breaking said seal.

Another object of the invention is to provide a valve of the character described wherein the valve discs are posiitvely moved into or out of sealing position.

A further object of the invention is to provide a double disc valve which is vented to the atmosphere to prevent accumulation of gases within the valve housing when the valve discs are closed and said vent is automatically closed when the valve discs are in open position.

These and other objects of the invention will be made apparent from the following specification and the drawings forming a part thereof wherein:

FIG. 2 shows a section through the valve on lines II—II; and

FIG. 3 shows the mode of attachment of the valve stems to valve discs.

Figure 1:
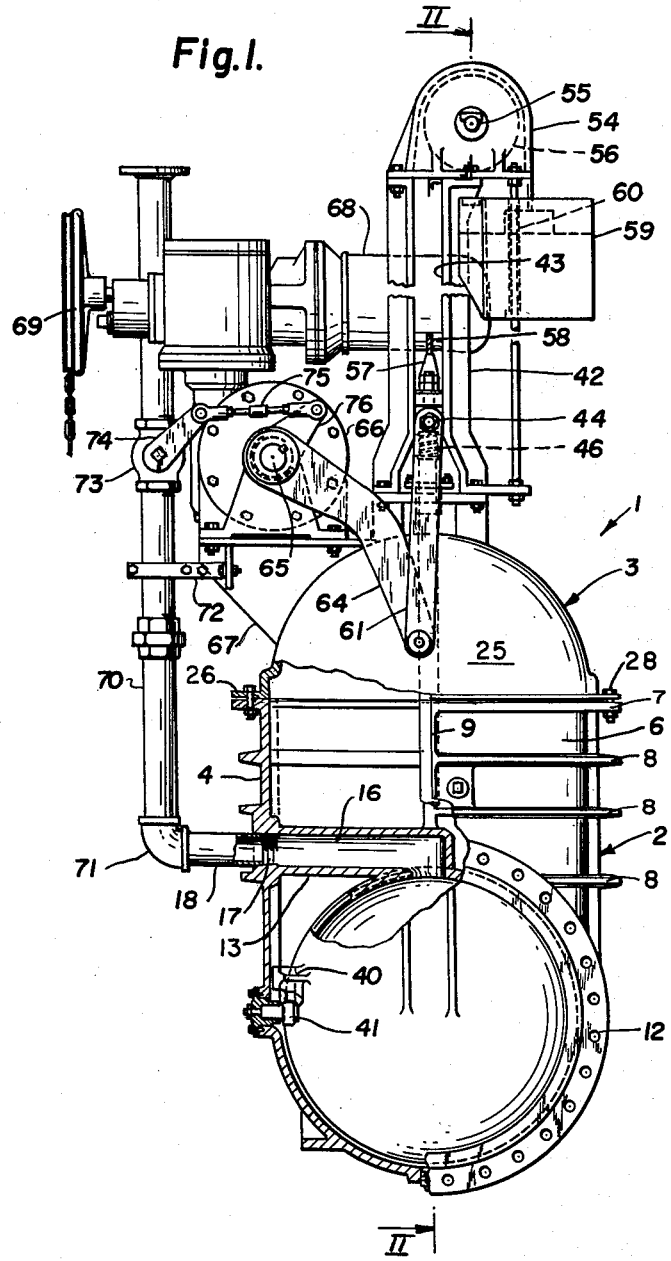
FIG. 1 shows a front elevation of the valve, partly in section.

Referring now in detail to the drawing, the valve 1 includes a body 2 and bonnet 3. The body 2 has a rectangular open top defined by side walls 4 connected by a bottom wall 5 and front and back walls 6. The upper portions of the side, front and back walls are reinforced by ribs 7, 8 and central ribs 9. The lower portion of the body 2 has an annular passageway 10 extending through the front and back walls 6. Such opening at each end thereof is defined by a shiftable annular flange 11 provided with bolt openings 12 for mounting in the gas or air line (not shown). Extending between the body walls 6 is a partition wall 13 dividing the body into two substantially equal chambers within which move the valve discs and stems. Said wall 13 has on opposite sides thereof annular valve disc seats 14 and 15. These seats 14 and 15 are machine finished for sealing with the valve discs. The partition wall 13 adjacent the top of the passageway 10 and between the valve disc seats has a gas vent passageway 16 extending to one side wall 4. The side wall 4 has a threaded opening 17 therein for reception of a vent pipe nipple 18. Flushing water drain openings 19 and 20 are provided in the valve body bottom wall 5 which are normally closed by suitable plugs 21 and 22. The valve bonnet 3 is comprised of spaced front and back walls 23 and 24 aligned with the corresponding valve body walls 6 and are connected by an arcuate side wall 25. Bonnet walls 23, 24 and 25 terminate in flanges 26 and 27 supported upon ribs 7 of the body walls and are connected thereto by suitable bolts 28. Adjacent the top of the bonnet and connecting the walls 23 and 24 is a wall 29 provided with passageways 30 therethrough and through wall 25 for passage of the valve disc stems. A central partition 31 in the bonnet is aligned with the body partition 13.

The valve discs 32 are circular and concave or dish shaped with annular flanges 33 having their outer faces machined for a sealing seat on the valve body seats 14 and 15. Valve stems 34 are connected to each valve disc and extend upwardly therefrom through the top of the valve bonnet 3. Each valve disc 32 has a bracket 35 on the convex face thereof provided with a transverse member 36 having an aperture 37 therethrough receiving one end of its associated valve stem and is connected thereto by a washer and lock nut 38. The opposite end of each valve stem extends upwardly through bonnet openings 30 and packing gland 39 therein. Each valve disc 32 adjacent the transverse center line thereof has a wedge member 40 thereon adjacent each side of the disc. A wedging roller 41 is mounted within the valve body 2 for engagement with the valve disc wedge member to seat the disc in wedged engagement with the seats 14 and 15 as the valve discs 32 move to closed position.

Mechanism for actuating the valve discs and stems is mounted upon the valve bonnet 3. Such mechanism includes a pair of transversely spaced stem guide members 42 having flat inner faces 43 providing bearing surfaces for a valve stem yoke 44. Such yoke extends transversely of the valve stems 34 and has openings 45 therein through which extend the upper ends of the valve stems 34. Each valve stem 34 adjacent the outer end thereof has a portion of reduced diameter upon which is mounted a coiled compression spring 46. The lower end of the spring is mounted on the stem shoulder 48 and the upper end of the spring is received in the recessed opening 49 surrounding the valve stem opening 45. The outer end of the valve stem is of further reduced diameter at 50, providing a shoulder 51 which engages within the recessed opening 49 on the bottom face of the yoke 44 restricting upward movement of the stem within the yoke 44. The stem portions 50 extend above the top of yoke 44 when the valve discs are in closed position and the outer ends of stem portions 50 are threaded to receive lock nuts 52 and washer 53. Mounted upon the upper ends of yoke guides 42 is a sheave stand 54 having a shaft 55 therein upon which is mounted sheave 56. The upper face of yoke 44 has a cable socket 57 mounted thereto from which extends a cable 58 threaded over said sheave and connected with a counter-weight 59. The counter-weight is guided in vertical movement by a pair of rods 60 extending between the base of the sheave stand 54 and the base of the yoke guides 42.

Vertical reciprocal movement is applied to the yoke 44 by means of a link 61 pivotally mounted on each end of yoke 44 upon a pin 62 and retained in place by nut 63. The lower ends of links 61 depend downwardly from said yoke 44 and connect to operating levers 64 which extend outwardly from said links, the outers ends of said levers 64 being rigidly connected to the ends of a shaft 65 of a suitable gear drive mechanism 66. Preferably such gear drive mechanism is a segment type worm gear drive, commercially available, and provides positive drive for both the opening and the closing of the disc valves. Such drive mechanism 66 is preferably mounted on the bonnet 3 by a suitable bracket such as 67. The drive mechanism 66 may be manually actuated by a suitable chain wheel and chain. Preferably a motor 68 is provided for actuating said drive mechanism 66, and said motor may be provided with a suitable manually operated chain wheel and suitable declutching lever 69 for connection with and manual operation of the motor in the case of power failure.

A vent pipe 70 is provided at one side of the valve, having one end connected by elbow 71 to nipple 18 and additionally supported in any suitable manner as by the supporting member 72 connected with bracket 67. Adjacent drive member 66, the vent pipe 70 includes a relief valve 73 having an exterior operating lever 74. This lever 74 is connected by means of an adjustable link member 75 to an operating member 76 mounted on shaft 65 of the drive mechanism 66. By this means the relief valve 73 is closed when the valve discs are raised to open position and the relief valve is opened when the valve discs are lowered to closed position.

As will be apparent from FIG. 2 of the drawing, the yoke 44, during opening movement of the valve, engages the washes 53 at the upper end of the valve stems 34 to impart vertical movement to the valve stems and associated valve discs 32. Vertical movement of the yoke is guided by the yoke guide members 42 and movement is imparted by the operating levers 64 acting through yoke links 61. The gear drive mechanism 66 has a rotating shaft 65 to which the operating levers 64 are attached and imparts movement thereto. The counter-weight acting through cable 58, attached to yoke 44 by the socket 57 and moving over sheave 56, assists the upward movement of the yoke and lessens the load on the motor 68. The motor 68 is provided with suitable limit switches (not shown) to stop the motor when the valve discs are raised a sufficient distance to open passageway 10 through the valve.

During closing movement of the valve, the direction of rotation of the motor and gear drive is reversed so as to lower the yoke 44 and raise the counter-weight 59. There is sufficient weight in the valve stems and discs so that during initial closing movement of the valve discs they are suspended through the valve stems in engagement with the yoke 44. As the valve discs approach a valve closed position, wherein the machined peripheral faces of flanges 33 of the discs 32 engage the machined peripheral seats 14 and 15 of the valve, a wedge member 40 at each side of each disc engages a roller 41 on the valve to wedge the discs into sealing engagement with the valve seats. This wedging action is resiliently accomplished by the yoke 44 acting through the coil springs 46. During compression of the springs 46, the yoke 44 moves downwardly along the valve stems 34 and away from the washer and nut 52, 53 at the top of the valve stems as indicated by FIG. 2 of the drawing. Each lever 64 is lowered by the mechanism such that the lowermost portion of each respective link 61, which includes the pivot connection of the lever 64 to the link 61, lies to the left of a vertical line drawn through a plane midway between faces 43 of members 42 as viewed in FIG. 1. In such position the yoke is held down by the links against the force of the compressed springs and the upward pull of the counterweight. When the links 61 are moved past the overcenter position, that is, to the right, as viewed in FIG. 1, the springs aid to initiate the upward movement of the valve discs in a rapid motion during the period of lost motion between the stems and the yoke so as to break the seal between the discs and the seats when the yoke strikes the washers with a hammer-like blow. This relative movement between the yoke and valve stems is of advantage. When the mechanism is again operated to raise the valve discs, the yoke moves relative to the stems in an upward direction and strikes the washer and nut 52, 53 on the upper ends of the stems 34. This sudden impact of the yoke serves to break the valves loose from their wedged position against the valve seats 14, 15. After the initial impact, the yoke, valves stems, and discs move smoothly upwardly to valve open position.

It will be understood that except for the initial impact of the yoke upon the valve stems, during opening movement, for breaking the seal between the valve discs and valve seats, the valve disc move smoothly from open to closed positions.

The dished shape of the valve discs assist in resisting back pressures when in closed position. The valve vent, open when the valve discs are in closed position, prevents accumulation of inflammable and explosive gases within the closed valve.

We claim:

1. In a valve for control of gaseous fluids, a valve housing, a central partition in said housing dividing the housing into two substantially equal half sections, a central annular passageway through said housing and partition adjacent the base thereof, annular valve disc seats on said partition at said passageway therethrough, a valve stem mounted within each said valve housing section and extending through the top of said housing, a valve disc mounted on each said valve stems and depending therefrom, each of said discs having an annular peripheral portion for engaging with an adjacent valve disc seat for closing said passageway through said portion, a yoke interconnected to the valve stems, means for imparting reciprocatory motion to the yoke to move the discs simultaneously to cover and uncover the passageway, the yoke being connected to the stems for limited relative movement therewith, resilient means positioned between the yoke and the stems for biasing the limited movement of the yoke and the stems, the resilient means being compressed when the discs are seated to close the valve passageway, the force of the resilient means during the limited relative movement of the yoke and stems being additive to the force of the means for imparting reciprocatory motion to the yoke when the yoke is moved by the latter means in a direction to unseat the discs and to uncover the passageway, the cumulative forces imparting a faster rate of movement of the stems to unseat the discs during the limited relative movement of the yoke and stems for positive unseating of the discs than the rate of movement imparted to the yoke solely by the means for imparting reciprocatory motion to the yoke said partition having an enclosed passageway therein overlying said first-named partition passageway and extending from an exterior wall of the housing to the central portion of the partition, said enclosed passageway having a connection at one end with the exterior of said housing and at the other end of the passageway with an opening into the spacing between said valve discs in closed position, valve means connected to the enclosed passageway, and means linked to the valve means and to the stems for opening the partition passageway and closing the valve means and vice versa.

2. In a valve for control of gaseous fluids, a valve housing, a central partition in said housing dividing the housing into two sections, a central annular passageway through said housing and partition adjacent the base thereof, annular valve disc seats on said partition at said passageway therethrough, a valve stem mounted within each of said valve housing sections and extending through the top of said housing, a valve disc mounted on each of said valve stems and depending therefrom, each of said discs having an annular peripheral portion for engaging with an adjacent valve disc seat for closing said passageway through said portion, a yoke having apertures therethrough, the ends of the valve stems being slidably received through the yoke apertures, yoke stop means fixed on the stem terminal portions extending through the yoke apertures for limiting the free movement of the yoke relative to the stems means for imparting reciprocatory motion to the yoke to move the stems and discs simultaneouly to cover and uncover the passageway, and resilient means positioned between the yoke and the stems for biasing the limited free movement of the yoke, the resilient means being compressed when the discs are seated to close the valve passageway, the force of the resilient means during the limited free movement of the yoke being additive to the force of the means for imparting reciprocatory motion to the yoke when the yoke is moved by the latter means in a direction to unseat the discs and to uncover the passageway, the cumulative forces imparting a faster rate of movement of the yoke to strike the yoke stop means on the stems to unseat the discs during the limited free movement of the yoke for positive unseating of the discs than the rate of movement imparted to the yoke solely by the means for imparting reciprocatory motion to the yoke.

3. A valve comprising a body with a passageway formed therethrough, discs positioned within the body to close the passageway at spaced locations, stems connected to the discs, a yoke connected to the stems for limited free movement relative to the stems, means connected slidably to the yoke for reciprocating the yoke to move the discs from a first position where the passageway is closed to a second position where the passageway is open and vice versa, a spring surrounding each stem and urging the yoke in a direction opposite the discs when the discs are in the first position, yoke stop means mounted on the stems on the side of the yoke opposite the springs, the yoke being freely movable on the stems between the stop means and the springs, the stop means being spaced from the yoke when the discs are in the first position and the springs being compressed by the yoke during such position of the discs, the springs forcing the yoke toward the stop means responsive to initial movement of the yoke for changing the position of the discs from the first position to the second by the means for reciprocating the yoke and stems for striking of the stop means by the yoke with a shock force to suddenly start the change of position of the discs whereby positive initial movement of the discs from the passageway is effected.

4. A double disc valve comprising a body with a passageway therethrough and having an upward extension with a bonnet thereon, means in the passageway providing oppositely facing valve seats, a pair of oppositely faced discs for cooperation with said seats and movable vertically from a closed position confronting their respective seats upwardly into said extension, a separate operating stem attached to each disc and projecting upwardly through and beyond the bonnet, the bonnet having a packing around each valve stem through which the stem is slidable vertically, a common yoke with which the stems are connected for limited relative lost motion, spring means operatively interposed between the stems and the yoke for yieldably urging the stems downwardly and the yoke upwardly against gravitational force, an operating link attached to each end of the yoke, an operating lever at each side of the bonnet connected to the respective links for moving said links vertically, said links in closing the valve being movable to an overcenter position after the discs are seated to compress said spring means with the yoke and to exert a continuous biasing downward force on said valve stems with said links and levers comprising the only means for holding the yoke against the action of said compressed springs whereby when the links in opening the valve are moved past said overcenter position said compressed springs act in conjunction with the links to initiate a sudden upward movement of the valve discs to break the seals of the discs with their respective seats, and a common operating means connected to said levers.

5. A double disc valve as in claim 4 wherein a cam surface on each valve disc cooperates with a fixed roller in the body for urging the respective discs toward each other and against their respective seats when the discs are in closed position, whereby when the valve is closed said springs act to exert a continuous biasing force to keep said cams and rollers in wedging engagement and prevent relative movement of the discs and their seats and chattering due to reverberatory conditions in the gas line in which the valve is located.

References Cited in the file of this patent

UNITED STATES PATENTS

| | | |
|---|---|---|
| 621,928 | Libbey | Mar. 28, 1899 |
| 1,020,076 | Bowser | Mar. 12, 1912 |
| 1,114,978 | Gamble | Oct. 27, 1914 |
| 2,793,002 | Kellar | Mar. 21, 1957 |
| 2,881,784 | Bryant | Apr. 14, 1959 |

FOREIGN PATENTS

| | | |
|---|---|---|
| 4,104 | Great Britain | of 1884 |
| 11,324 | Australia | of 1928 |